(12) United States Patent  (10) Patent No.: US 9,204,390 B2
Jo et al.  (45) Date of Patent: Dec. 1, 2015

(54) ENERGY-SAVING MOBILE NODE CONTROL METHOD USING WIRELESS MULTI-INTERFACES

(71) Applicant: Electronics and Telecommunications Research Institute, Daejeon (KR)

(72) Inventors: Seng-Kyoun Jo, Cheongju-si (KR); Il-Gu Jung, Daejeon (KR); Kyoung-Hee Lee, Daejeon (KR); Hyun-Woo Lee, Daejeon (KR); Won Ryu, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 128 days.

(21) Appl. No.: 13/791,242

(22) Filed: Mar. 8, 2013

(65) Prior Publication Data

US 2013/0235774 A1 Sep. 12, 2013

(30) Foreign Application Priority Data

Mar. 9, 2012 (KR) ........................ 10-2012-0024620

(51) Int. Cl.
*H04W 52/02* (2009.01)
(52) U.S. Cl.
CPC ............ *H04W 52/0219* (2013.01); *Y02B 60/50* (2013.01)
(58) Field of Classification Search
CPC ............ H04W 80/10; H04W 52/0209; H04W 72/121; H04W 40/246; H04W 52/0219
USPC ................. 370/252, 310, 311, 328, 331, 349; 455/41, 434, 445
See application file for complete search history.

(56) References Cited

U.S. PATENT DOCUMENTS

| 8,750,242 B2* | 6/2014 | Forte et al. .................... 370/331 |
| 2005/0002407 A1* | 1/2005 | Shaheen et al. ............... 370/401 |
| 2006/0126535 A1* | 6/2006 | Sherman ....................... 370/254 |
| 2009/0061862 A1* | 3/2009 | Alberth et al. ................ 455/434 |
| 2009/0221261 A1 | 9/2009 | Soliman |
| 2010/0142403 A1* | 6/2010 | Baumgarth et al. .......... 370/254 |
| 2012/0033577 A1* | 2/2012 | Chiang ......................... 370/252 |
| 2012/0238208 A1* | 9/2012 | Bienas et al. ................ 455/41.2 |
| 2013/0201847 A1* | 8/2013 | Chincholi et al. ............ 370/252 |

FOREIGN PATENT DOCUMENTS

KR 10-2010-0127812 A 12/2012

OTHER PUBLICATIONS

A Cooperative Clustering Protocol for Energy Saving of Mobile Devices with WLAN and Bluetooth Interfaces (IEEE Transactions on Mobile Computing, vol. 10, No. 5, pp. 491-504, Apr. 2011).

* cited by examiner

*Primary Examiner* — Jianye Wu
(74) *Attorney, Agent, or Firm* — William Park & Associates Ltd.

(57) ABSTRACT

Provided is a node control apparatus communicating an external Internet Protocol (IP) network and managing a plurality of mobile nodes included in a local network. The node control apparatus manages information relating to the plurality of mobile nodes, each equipped with one or more wireless interfaces, configures one or more groups by classifying the plurality of mobile nodes according to the type(s) of the wireless interface(s) of each of the plurality of mobile nodes, selects a representative node for each of the groups, and allows the member nodes of each of the groups to communicate with the external IP network via their representative node. Therefore, it is possible to minimize power consumption by selectively using a wireless interface for use in connecting to the representative node of each of the groups.

15 Claims, 10 Drawing Sheets

| TERMINAL | NEIGHBORING NODE | WIRELESS INTERFACE | AVAILABLE BANDWIDTH (bps) | POWER CONSUMPTION (mW) |
|---|---|---|---|---|
| NODE#2 | NODE#3 | BLUETOOTH | 300K | 100 |
| | | WLAN | 1.5M | 260 |
| | NODE#4 | BLUETOOTH | 600K | 90 |

310

| TERMINAL | NEIGHBORING NODE | WIRELESS INTERFACE | AVAILABLE BANDWIDTH (bps) | POWER CONSUMPTION (mW) |
|---|---|---|---|---|
| NODE#5 | NODE#6 | ZIGBEE | 230K | 20 |
| | | WLAN | 2.5M | 350 |
| | NODE#7 | ZIGBEE | 180K | 30 |

| TERMINAL | NEIGHBORING NODE | WIRELESS INTERFACE | AVAILABLE BANDWIDTH (bps) | POWER CONSUMPTION (mW) | NODE ADDRESS |
|---|---|---|---|---|---|
| NODE#1 | - | W | 7.5M | 320 | 20.0.0.100 |
| NODE#2 | NODE#3 | B | 300K | 100 | 20.0.0.101 |
|  | NODE#4 | W | 4.0M | 260 |  |
|  |  | B | 600K | 90 |  |
| NODE#3 | NODE#2 | B | 500K | 90 | 20.0.0.102 |
|  | NODE#4 | W | 5.5M | 240 |  |
|  |  | B | 600K | 90 |  |
| NODE#4 | NODE#2 | B | 500K | 90 | 20.0.0.103 |
|  | NODE#3 | B | 300K | 90 |  |
| NODE#5 | NODE#6 | Z | 230K | 70 | 20.0.0.104 |
|  | NODE#7 | W | 6.8M | 260 |  |
|  |  | Z | 200K | 50 |  |
| NODE#6 | NODE#5 | Z | 210K | 80 | 20.0.0.105 |
|  | NODE#7 | W | 7.5M | 270 |  |
|  |  | Z | 280K | 50 |  |
| NODE#7 | NODE#5 | Z | 210K | 80 | 20.0.0.104 |
|  | NODE#6 | Z | 280K | 70 |  |

ENERGY-SAVING MOBILE NODE CONTROL METHOD USING WIRELESS MULTI-INTERFACES

CROSS-REFERENCE TO RELATED APPLICATION(S)

This application claims the benefit under 35 U.S.C. §119 (a) of Korean Patent Application No. 10-2012-0024620, filed on Mar. 9, 2012, in the Korean Intellectual Property Office, the entire disclosure of which is incorporated herein by reference for all purposes.

BACKGROUND

1. Field

The following description relates to a mobile node control technique capable of maintaining the network connectivity of a mobile node while saving energy by minimizing the power consumption of a mobile node using wireless multi-interfaces installed in the mobile node.

2. Description of the Related Art

In accordance with a growing importance of the environment, research has been conducted into ways to combine Information and Communication Technology with the environment, for example, a method to minimize power consumption while maintaining the performance of a communication network. For such systems or devices with limited power as mobile terminals, power consumption is one of the most important factors to consider. Accordingly, research has been carried out on how to minimize the energy consumption in the Physical (PHY) layer of a network in consideration of the properties of various wireless interfaces.

A Wireless Local Area Network (WLAN), which is one of the most-widely used wireless interfaces for mobile terminals, is a short-range communication network established within a certain range of an access point (AP) where high-speed internet connections are available.

Recent developments in technology have enabled communication within a 50 m to 100 m range of an AP and bandwidths of up to 300 Mbps, which are available for network access in various fields of industry. However, in the case of using the WLAN interface, mobile nodes generally consume a considerable amount of power to receive signals from an AP, as compared to using other wireless interfaces.

A Bluetooth interface is also widely used along with the WLAN interface. The Bluetooth interface is a wireless interface originally for allowing communication systems to communicate within a short range of 10 m or less of one another and is characterized by its low power consumption. Since the Bluetooth interface nowadays can offer a communication range of up to 100 m, and can provide connectivity even in the presence of walls or other obstacles, the Bluetooth interface has been employed in various home appliances and other various systems. A ZigBee interface, which is another wireless interface for short-range communication (i.e., a 10 m to 20 m-range communication) for use in homes or offices, is characterized by transmitting a small amount of data while minimizing power consumption. The ZigBee interface has increasingly become popular as a wireless interface suitable for solutions for establishing a ubiquitous communication environment, such as an object-to-object communication environment.

In the meantime, most mobile terminals are equipped with two or more wireless interfaces to overcome various environmental limitations and be provided with various services. More specifically, most smart phones are equipped with the WLAN interface and the Bluetooth interface. Accordingly, mobile terminals may communicate with an external network via the WLAN interface and may communicate with peripheral devices or other mobile terminals via the Bluetooth interface.

When the wireless interface of a mobile terminal are all in standby mode for communication, the mobile terminal continues to consume power to detect all control signals and any upcoming communication events. To address this problem, a user of the mobile terminal may manually select and manage a wireless interface via which to communicate. However, this type of method requires turning on or off each wireless interface whenever necessary to communicate, and may be highly inappropriate for the type of communication for programs run in a terminal system that does not appear on a user interface (UI).

SUMMARY

The following description relates to dynamically configuring one or more groups of mobile nodes in consideration of the properties of one or more wireless interfaces of each mobile node in a small-size network and allowing each mobile node to communicate in units of the is groups so as to minimize the power consumption of each mobile node through selective use of multi-interfaces of each mobile node.

In one general aspect, there is provided an operating method of a node control apparatus connected to an external Internet Protocol (IP) network and a local network, the operating method including: managing information relating to a plurality of mobile nodes in the local network, each equipped with one or more wireless interfaces; configuring one or more groups by classifying the plurality of mobile nodes according to the type(s) of the wireless interface(s) of each of the plurality of mobile nodes; selecting a representative node for each of the groups; and allowing one or more member nodes of each of the groups to communicate with the external IP network via their representative node.

In another general aspect, there is provided a node control apparatus communicating an external IP network and managing a plurality of mobile nodes included in a local network, the node control apparatus including: an information processing unit which manages information relating to the plurality of mobile nodes, each equipped with one or more wireless interfaces, configures one or more groups by classifying the plurality of mobile nodes according to the type(s) of the wireless interface(s) of each of the plurality of mobile nodes; and selects a representative node for each of the groups; and a communication unit which is connected to the external IP network and communicates with one or more mobile nodes with a broadband wireless interface, among the plurality of mobile nodes.

In another general aspect, there is provided a mobile node, including: a network interface unit which includes a broadband wireless interface; and a control unit which collects information relating to one or more neighboring nodes, transmits a neighboring node information update request message, including the collected information, to a node control apparatus via the network interface unit, and configures a neighboring node information management table based is on the collected information.

According to the present inventive concept, one or more virtual groups of mobile nodes each equipped with multiple wireless interfaces may be configured, a representative node may be selected from each of the groups, and the member nodes of each of the groups may be allowed to communicate with an external IP network via their representative node.

Also, the duration of use of each mobile terminal may be increased by minimizing the power consumption of each mobile terminal in consideration of the pattern of the power consumption of each mobile terminal in accordance with the properties of each wireless interface. Also, network connectivity may be provided even to nodes only with a wireless interface for use in Layer 2 communication by using a representative node capable of performing IP communication.

Other features and aspects may be apparent from the following detailed description, the drawings, and the claims.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following description is provided to assist the reader in gaining a comprehensive is understanding of the methods, apparatuses, and/or systems described herein. Accordingly, various changes, modifications, and equivalents of the methods, apparatuses, and/or systems described herein may be suggested to those of ordinary skill in the art. Also, descriptions of well-known functions and constructions may be omitted for increased clarity and conciseness.

Figure 1:
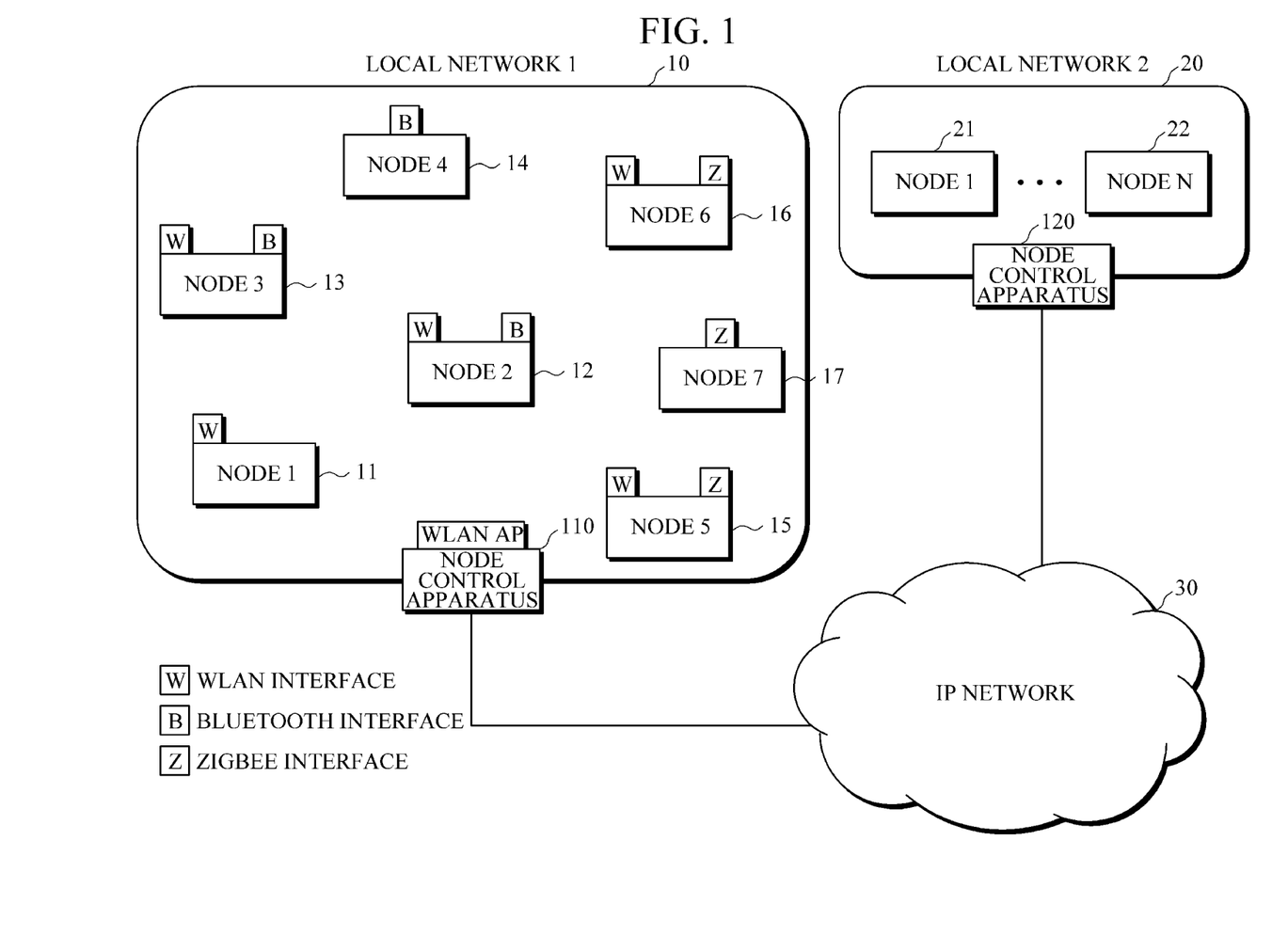
FIG. 1 is a diagram illustrating an example of a network system according to an exemplary embodiment.

FIG. 1 illustrates an example of a network system according to an exemplary embodiment.

Referring to the network system illustrated in FIG. 1, one or more local networks (i.e., first and second local networks 10 and 20) may be connected to an Internet Protocol (IP) network 30. The first and second local networks 10 and 20 may be configured to be physically different from each other according to the range of provision of a wireless interface. For example, the first and second local networks 10 and 20 may be home networks, and various nodes within a certain range that can be covered by wireless signals, such as an office or a building, may form a single local network.

The first local network 10 includes a plurality of nodes (i.e., first to seventh nodes 11 to 17) and a first node control apparatus 110. The second local network 20 includes a plurality of nodes (i.e., first and N-th nodes 21 and 22) and a second node control apparatus 120.

The nodes 11 to 17, 21, and 22 may be mobile nodes each equipped with a single wireless interface or multiple wireless interfaces. For example, the nodes 11 to 17, 21, and 22 may include various terminals such as smartphones, tablet personal computers (PCs), etc. that can communicate via a wireless interface without the need to be connected via wired means. For example, the first node 11 may be a PC having a Wireless Local Area Network (WLAN) interface, the second and third nodes 12 and 13 may be portable terminals having the WLAN interface and a Bluetooth interface, and the fourth node 14 may be a mobile terminal having the Bluetooth interface only. In this example, the fourth node 14 can communicate with other nodes via Bluetooth, but cannot communicate with an external IP network 30 without the aid of a Bluetooth Network Access Point (BNAP). For example, the fifth node 15 may be a portable terminal having the WLAN interface and a ZigBee interface.

The first node control apparatus 110 manages the first to seventh nodes 11 to 17 in the first local network 10. The first node control apparatus 110 is connected to the external IP Network and can thus allow the first to seventh nodes 11 to 17 to be connected to the external IP network 30 via the first node control apparatus 110. The second node control apparatus 120 manages the first and N-th nodes 21 and 22 in the second local network 20. The second node control apparatus 120 is also connected to the external IP network 30 and can thus allow the first and N-th nodes 21 and 22 to communicate with the external IP Network via the second node control apparatus 120.

The first and second node control apparatuses 110 and 120 not only manage the nodes in the first and second local networks 10 and 20 but also serve as APs for the external IP network 30. For example, the first node control apparatus 110, which is connected to the external IP network 30, may transmit packets from the first to seventh nodes 11 to 17 to the external IP network 30 or may transmit packets from the external IP network 30 to the first local network 10 with the use of group information.

Each of the first and second node control apparatuses 110 and 120 may include a broadband wireless interface. For example, the first and second node control apparatuses 110 and 120 may use the WLAN interface as a broadband wireless interface.

The first node control apparatus 110 may configure a group in consideration of the properties of the wireless interface(s) of each node, may select a node from the group as a representative node, and may allow the other nodes in the group, i.e., member nodes, to communicate with an external network via the representative node while consuming less power. The representative node supports the member nodes such that the member nodes can communicate with an external network via the representative node.

For example, in response to the first node 11 with the WLAN interface accessing the first node control apparatus 110, the first node control apparatus 110 allocates a node address that can be identified within the first local network 10 to the first node 11. In response to receipt of neighboring node information (for example, information relating to the second node 12, which is adjacent to the first node 11) from the first node 11, the first node control apparatus 110 divides the first and second nodes 11 and 12 into one or more groups in consideration of the properties of the wireless interface(s) of each of the first and second nodes 11 and 12 so as to minimize the power consumption of the first and second nodes 11 and 12.

Each of the first and second node control apparatuses 11 and 12 is illustrated in FIG. 1 as being connected to a WLAN by a single AP. However, in reality, each of the first and second node control apparatuses 11 and 12 may be configured to be connected to a WLAN by an AP and a gateway, which are connected to each other. A node control apparatus and method according to exemplary embodiments will hereinafter be described, taking the first local network 10 as an example.

Figure 2:
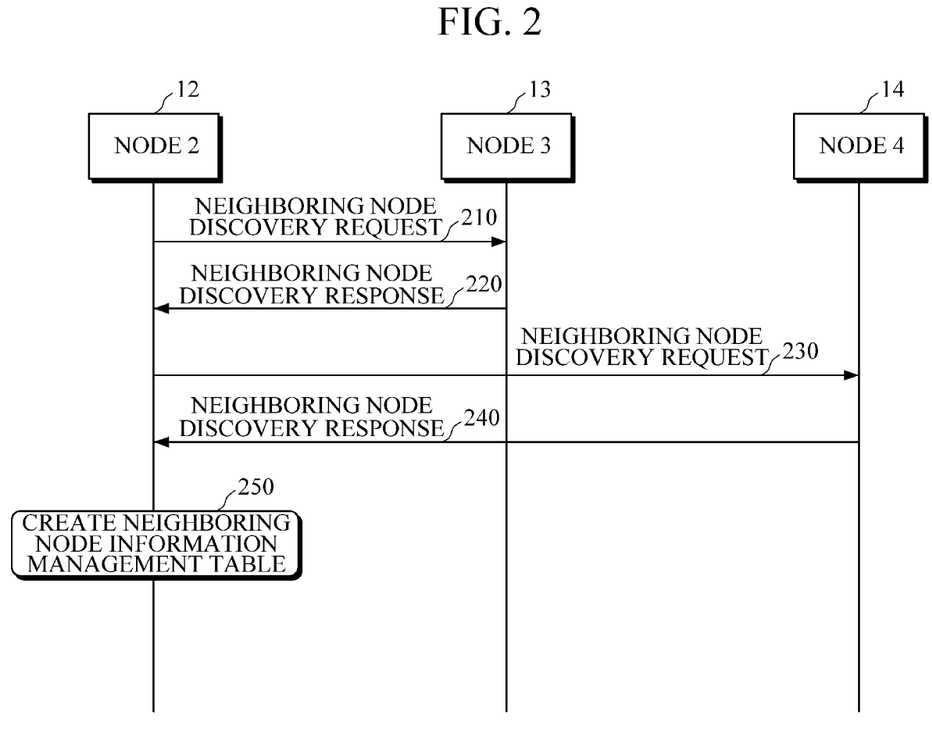
FIG. 2 is a diagram illustrating an example of discovering a neighboring node and transmitting data to or receiving data from the discovered neighboring node, according to an exemplary embodiment.

FIG. 2 illustrates an example of discovering a neighboring node and transmitting data to or receiving data from the discovered neighboring node, according to an exemplary embodiment.

It will hereinafter be described with reference to FIG. 2 how the second node 12 in the first local network 10 discovers its neighboring nodes by communicating with the use of a wireless interface other than the WLAN interface before accessing the first node control apparatus 110 and transmits data to or receives data from the discovered neighboring nodes.

Referring to FIG. 2, since the second node 12 can use the Bluetooth interface as well as the WLAN interface, the second node 12 activates the Bluetooth interface and transmits a neighboring node discovery request message to determine whether there is any neighboring node using the Bluetooth interface. The neighboring node discovery request message includes the identifier (ID) of the second node 12. For example, in operations 210 and 230, the neighboring node discovery request message may be transmitted to the third and fourth nodes 13 and 14.

In response to receipt of the neighboring node discovery request message from the second node 12, in operations 220 and 240, each of the third and fourth nodes 13 and 14 transmits a neighboring node discovery response message to the second node 12. Each of the neighboring node discovery response messages may include the IDs of the third and fourth nodes 13 and 14, one or more available wireless interfaces of each of the third and fourth nodes 13 and 14, available bandwidth information for each of the available wireless interfaces of each of the third and fourth nodes 13 and 14, and power consumption information for each of the available wireless interfaces of each of the third and fourth nodes 13 and 14.

Since the arrival time of the neighboring node discovery request message varies depending on the distance to each destination node and the signal intensity of the neighboring node discovery request message, the second node 12 may not necessarily need to process neighboring node discovery response messages in order of receipt. In response to receipt of the neighboring node discovery response messages transmitted by the third and fourth nodes 13 and 14, the second node 12 identifies its neighboring nodes, i.e., the third and fourth nodes 13 and 14, and records the identified neighboring nodes in a neighboring node information table.

Figure 3:
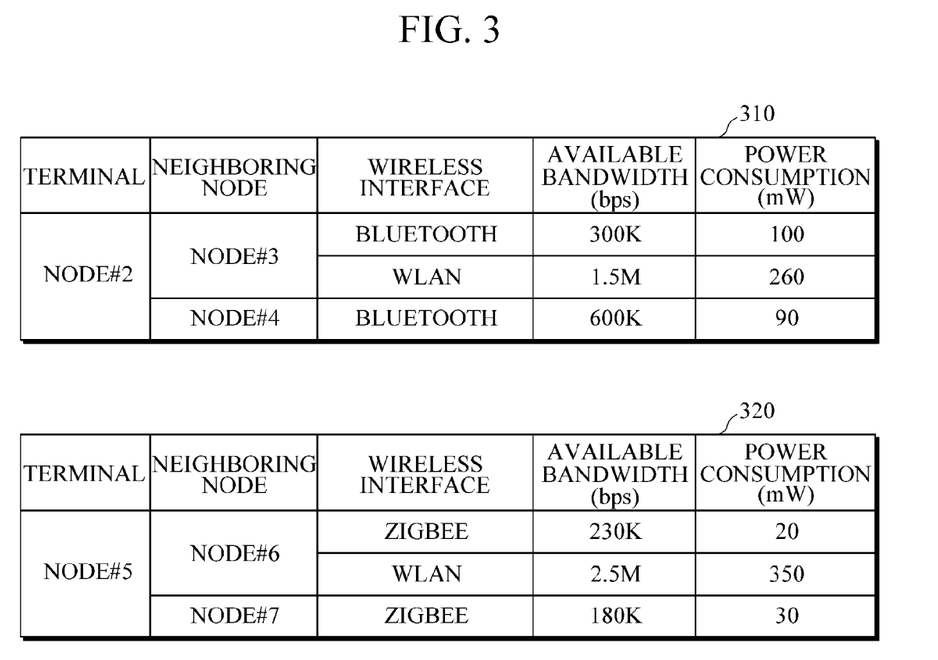
FIG. 3 is a diagram illustrating an example of neighboring node information management tables managed by nodes 2 and 5, according to an exemplary embodiment.

Not only a node using the Bluetooth interface but also a node using the ZigBee interface or another wireless interface may perform neighboring node discovery using the same method illustrated in FIG. 3.

FIG. 3 illustrates an example of neighboring node information management tables managed by the second and fifth nodes 12 and 15, according to an exemplary embodiment.

Referring to FIG. 3, a neighboring node information management table 310 may be created and managed by the second node 12 based on information included in each neighboring node discovery response message. In the neighboring node information management table 310, the second, third, and fourth nodes 12, 13, and 14 are referred to as Node#2, Node#3, and Node#4, respectively.

The neighboring node information management table 310 shows that the second node 12 has transmitted a neighboring node discovery request message via the Bluetooth interface and has received a neighboring node discovery response message from each of the third and fourth nodes 13 and 14. The neighboring node information management table 310 also shows that the third node 13 has one more available wireless interface other than the Bluetooth interface used to communicate with the second node 12, i.e., the WLAN interface.

The second node 12 may extract available bandwidth information and power consumption information for each available wireless interface from each of the neighboring node discovery response message received from the third and fourth nodes 13 and 14, and may record the extracted information in the neighboring node information management table 310. Power consumption information, which indicates the amount of power consumed per unit time by each wireless interface, may vary depending on the manufacturer and the hardware state of each mobile node. The neighboring node information management table 310 may also include Bluetooth ID information of the third and fourth nodes 13 and 14, which are the neighboring nodes of the second node 12. The term "Bluetooth ID information", as used herein, indicates an ID used to access a network via Bluetooth.

A neighboring node information management table 320 may be created and managed by the fifth node 15 based on information included in each neighboring node discovery response message. The neighboring node information management table 320 shows that the fifth node 12 has received a neighboring node discovery response message from each of the sixth and seventh nodes 16 and 17 via the ZigBee interface, and that the sixth node 16 has both the ZigBee interface and the WLAN interface. The fifth node 15 may extract available bandwidth information and power consumption information for each available wireless interface from each of the neighboring node discovery response messages received from the sixth and seventh nodes 16 and 17, and may record the extracted information in the neighboring node information management table 320. The neighboring node information management table 320 may also include ZigBee ID information of the sixth and seventh nodes 16 and 17, which are the neighboring nodes of the fifth node 15. The term "ZigBee ID information", as used herein, indicates an ID used to access a network via ZigBee.

The first to seventh nodes 11 to 17 may identify their neighboring nodes through the above-mentioned neighboring node discovery process. Then the registration of the first to seventh nodes 11 to 17 with the first node control apparatus 110 may be performed based on the neighboring node information management tables of the first to seventh nodes 11 to 17.

Figure 4:
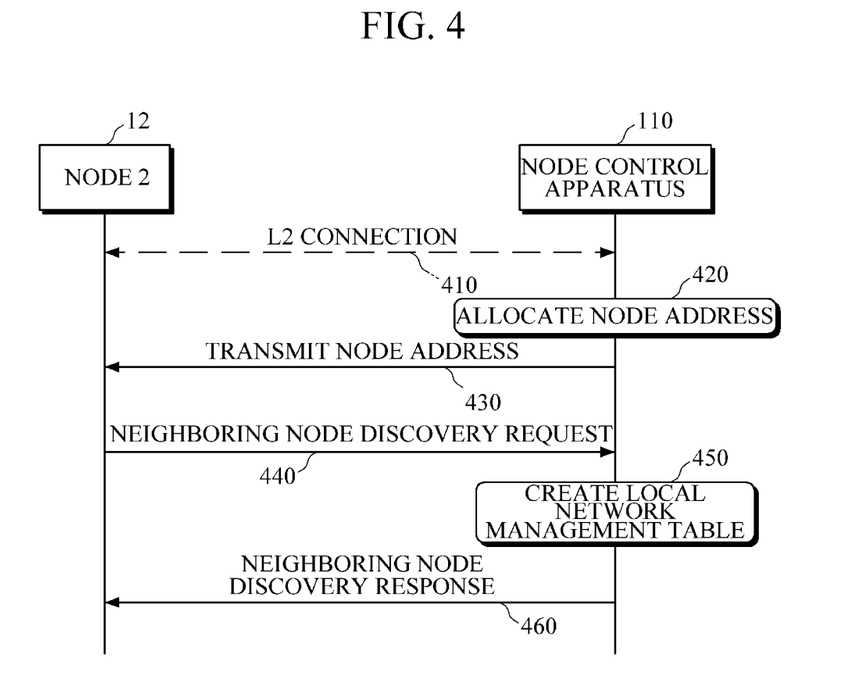
FIG. 4 is a diagram illustrating an example of registering a node with a node control apparatus with the use of a Wireless Local Area Network (WLAN) interface, according to an exemplary embodiment.

FIG. 4 illustrates an example of registering a node with a node control apparatus via the WLAN interface, according to an exemplary embodiment.

Any node in the first or second local network 10 or 20 with the WLAN interface may be subject to a registration process illustrated in FIG. 4. However, nodes not equipped with the WLAN interface, for example, the fourth and seventh nodes 14 and 17, may not participate in the registration process illustrated in FIG. 4. Also, since the first node 11 has no other wireless interface available than the WLAN interface, the first node 11 exceptionally transmits WLAN interface information thereof in response to receipt of a neighboring node information update is request message.

The registration of the second node 12 with the first node control apparatus 110 with the use of the WLAN interface is described with reference to FIG. 4.

Referring to FIG. 4, the second node 12 performs Layer 2 (L2) access via the WLAN interface to register the information included in the neighboring node information management table 310 with the first node control apparatus 110. The term "L2 access", as used herein, includes all processes that may be performed in Layer 1 (L1) and L2 until the second node 12 receives a node address.

In response to completion of the setting of a communication between the second node 12 and a WLAN AP via L2 access, in operation 420, the first node control apparatus 110 allocates a node address to the second node 12 so that the second node 12 can be identified by the allocated node address. The allocated node address may be an ID required to use the WLAN interface, which is a wireless network interface shared between the second node 12 and the first node control apparatus 110. For example, the allocated node address may be referred to as a Layer 3 (L3) ID, whereas an ID for use in Bluetooth-based L2 communication and an ID for use in ZigBee-based L2 communication may both be referred to as L2 IDs.

In operation 430, the first node control apparatus 110 transmits the allocated node address to the second node 12. In operation 440, the second node 12 performs network setting based on the allocated node address, and transmits a neighboring node information update request message, including neighboring node information of the second node 12, to the first node control apparatus based on the neighboring node information management table 310. The term "neighboring node information", as used herein, may include information included in the neighboring node information management table 310, for example, the type of each wireless interface, available bandwidth information for each wireless interface, power consumption is information for each wireless interface.

In operation 450, the first node control apparatus 110 writes the neighboring node information of the second node 12, which is included in the neighboring node information update request message transmitted by the second node 12, in a local network management table. In operation 460, the first node control apparatus 110 transmits a neighboring node information update response message to the second node 12.

In response to completion of the registration of all the nodes in the first local network 10, as described above with reference to FIG. 4, the first node control apparatus 110 may have updated information on all the nodes in the first local network 10.

Figure 5:
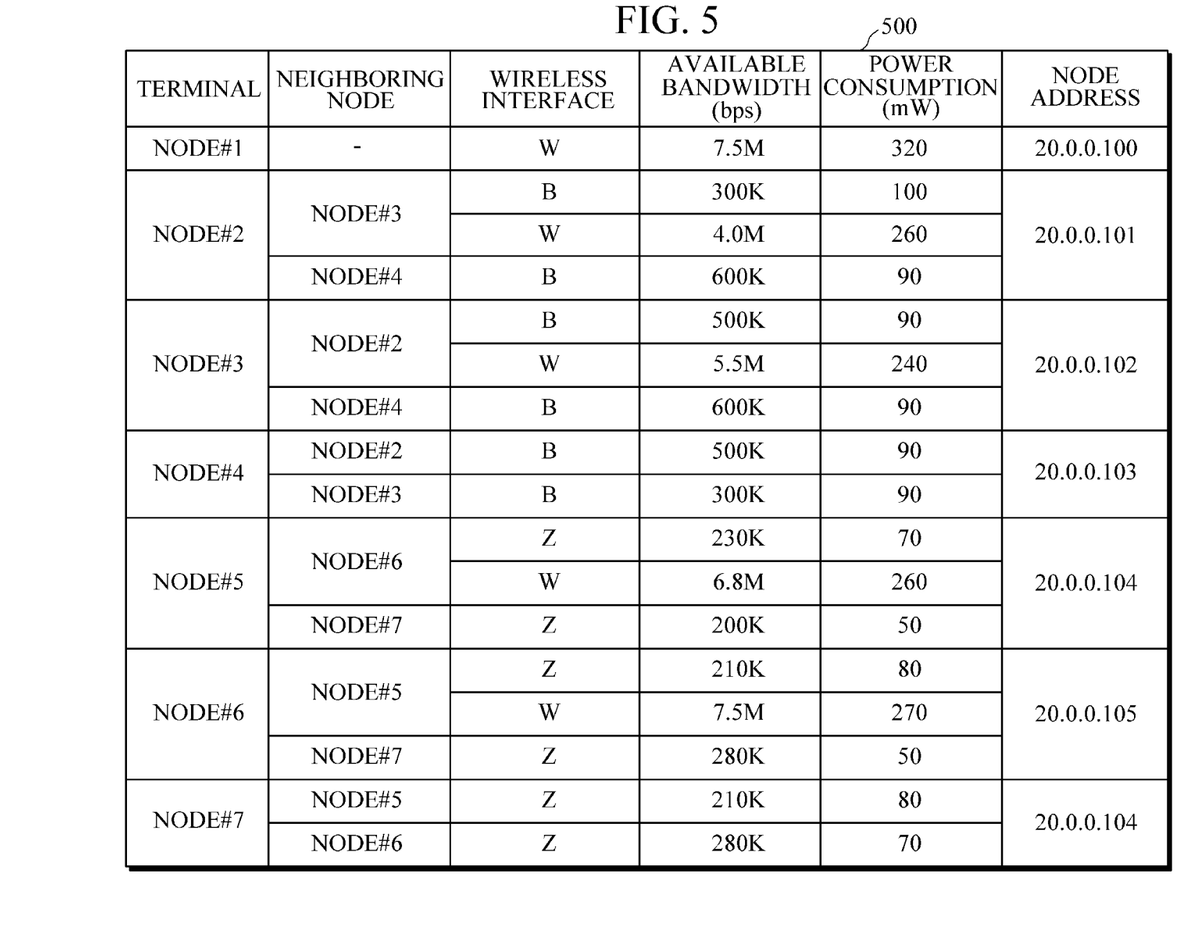
FIG. 5 is a diagram illustrating an example of a local network management table created by a node control apparatus after the registration of nodes with the node control apparatus, according to an exemplary embodiment.

FIG. 5 illustrates an example of a local network management table that may be created by a node control apparatus after the registration of nodes with the node control apparatus, according to an exemplary embodiment.

Referring to FIG. 5, in response to completion of the registration of all the nodes in the first local network 10, the first node control apparatus 110 may create a local network management table 500. The local network management table 500 may provide information relating to all the nodes in the first local network 10, for example, node addresses, wireless interface information, available bandwidth information, power consumption information, and wireless network interface IDs (other than WLAN interface IDs).

As illustrated in FIG. 4, each node can easily discover nodes not using the WLAN interface through neighboring node discovery without the need to transmit wireless interface information. For example, since the fourth and seventh nodes 14 and 17 only have the Bluetooth interface and the ZigBee interface, respectively, the fourth and seventh nodes 14 and 17 cannot access the node control apparatus 110 and transmit their node information to the node control apparatus 110 without the aid of additional equipment. Even nodes using the same wireless interfaces (except the WLAN interface) may not be able to communicate if they become apart beyond their communication range. Therefore, it is necessary to determine whether nodes are within one another's communicable range by performing neighboring node discovery.

Referring to FIG. 5, neighboring node information of the fourth and seventh nodes 14 and 17 is not received from the fourth and seventh nodes 14 and 17 but calculated based on information received from other nodes adjacent to the fourth and seventh nodes 14 and 17. For example, the first node control apparatus 110 may identify, from information received from the second node 12, that the third and fourth nodes 13 and 14 are the neighboring nodes of the second node 12, and may identify, from information received from the third node 13, that the second and fourth nodes 12 and 14 are the neighboring nodes of the third node 13. In this example, the first node control apparatus 110 may recognize, from the information received from the second and third nodes 12 and 13, that the fourth node 14 can communicate with the second and third nodes 12 and 13 by using the Bluetooth interface. Similarly, the first node control apparatus 110 may recognize, from information received from the fifth and sixth nodes 15 and 16, that the seventh node 17 can communicate with the fifth and sixth nodes 15 and 16 by using the ZigBee interface.

Variable bandwidths and power consumption measurements provided in the local network management table 500 are exemplary. For example, IP addresses, which are frequently used as L3 IDs on the Internet, may be provided in the local network management table 500 as node addresses. As another example, various types of IDs other than IP addresses, such as email addresses, Public Switched Telephone Network (PSTN) numbers or mobile phone numbers, Uniform Resource Locators (URLs)/Uniform Resource Identifiers (URIs), International Mobile Subscriber Identifiers (IMSIs), Network Access Identifiers (NAIs), etc., may be provided in the local network management table 500 as node addresses.

To minimize the power consumption of each node in a local network, the first node control apparatus 110 configures a group based on information collected from each mobile node in consideration of the properties of each wireless interface of each mobile node, and selects a node from the group as a representative node.

Figure 6:
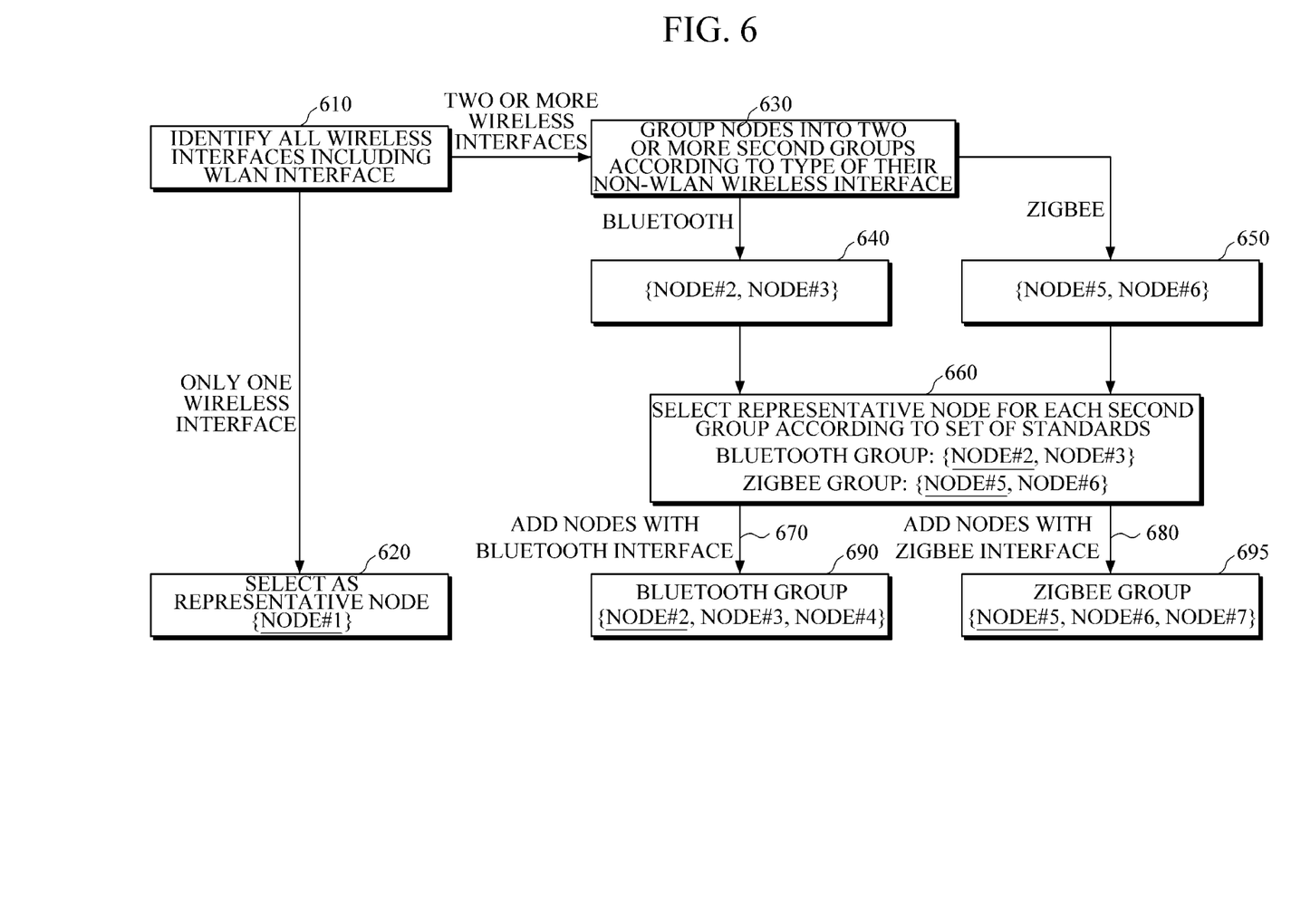
FIG. 6 is a diagram illustrating an example of group configuration and representative node selection processes, according to an exemplary embodiment.

FIG. 6 illustrates an example of group configuration and representative node selection processes, according to an exemplary embodiment.

Referring to FIG. 6, in operation 610, the first node control apparatus 110 identifies the number of wireless interfaces (including the WLAN interface) that may be provided by each of the first to seventh nodes 11 to 17 based on information collected from each of the first to seventh nodes 11 to 17, as illustrated in FIG. 5.

In operation 620, since the first node 11 uses only one wireless interface whereas the second to seventh nodes 12 to 17 are mobile nodes using two wireless interfaces, the first node control apparatus 110 configures the first node 11 as a first group, and selects the first node 11 as a representative node of the first group. Accordingly, the first node 11 may directly communicate with the first node control apparatus 100 via the WLAN interface.

In operation 630, the first node control apparatus 110 classifies one or more nodes having two wireless interfaces including the WLAN interface into one or more groups according to the type of their non-WLAN interface. For example, the first node control apparatus 110 divides the nodes having two wireless interfaces including the WLAN interface into a Bluetooth group and a ZigBee group.

In operation 640, the first node control apparatus 110 classifies the second and third nodes 12 and 13 into the Bluetooth group. In operation 650, the first node control apparatus 110 classifies the fifth and sixth nodes 15 and 16 into the ZigBee group. At this stage, any node in the Bluetooth group or in the ZigBee group may be available for designation as a representative node because all the nodes in each of the Bluetooth group and the ZigBee group are able to communicate with the use of multiple interfaces. However, to minimize power consumption, it is necessary to select an optimum representative node for each of the Bluetooth group and the ZigBee group.

The selection of a representative node for a group may be performed in various manners. For example, in consideration that the amount of power consumed by each mobile node varies depending on the type of wireless interface used and available bandwidth also varies from one wireless interface to another wireless interface, an importance score w of a wireless interface may be calculated by using all factors that may affect the performance of wireless interfaces, for example, an available bandwidth, power consumption, operating cost, etc., as indicated by the following function: w=w1×f1+w2× f2(Power Consumption)+ ... where f1 denotes bandwidth, f2 indicates power consumption, w1 indicates a weight for the bandwidth f1, and w2 indicates a weight for the power consumption f2. Weights may also be applied to other factors than the bandwidth f1 and the power consumption f2. In this manner, the importance score w may be calculated for each mobile node.

For example, in a case in which there is only a slight difference between the power consumption of the Bluetooth interface and the power consumption of the ZigBee interface and thus the performance of the Bluetooth interface is not much different from the performance of the ZigBee interface, a node having a large available bandwidth for the WLAN interface may be selected as a representative node.

For example, in consideration that a representative node is required to be connected to an external network via the WLAN interface while maintaining its one-on-one communication with other member nodes, an available bandwidth for the WLAN interface may be selected as a factor for selecting a representative node. In this example, in operation 660, the first node control apparatus 110 may select the second node 12 and the fifth node 15 as the representative nodes of the Bluetooth group and the ZigBee group, respectively.

The first node control apparatus 110 classifies nodes in the first local network 10 yet to be grouped, i.e., nodes not using the WLAN interface, into the Bluetooth group and the ZigBee group, thereby completing the whole group configuration and representative node selection processes. For example, the first node control apparatus 110 may add the fourth node 4 having the Bluetooth interface to the Bluetooth group and the seventh node 7 having the ZigBee interface to the ZigBee group. In response to completion of the group configuration and representative node selection processes, as illustrated in FIG. 6, the first node control apparatus 110 may obtain a Bluetooth group including the second, third, and fourth nodes 12, 13, and 14 and a ZigBee group including the fifth, sixth, and seventh nodes 15, 16, and 17.

The first node control apparatus 110 may notify a node selected as a representative node, and provides the representative node with information relating to its member nodes. The representative node of each group may notify its member nodes that it is their representative node.

Figure 7:
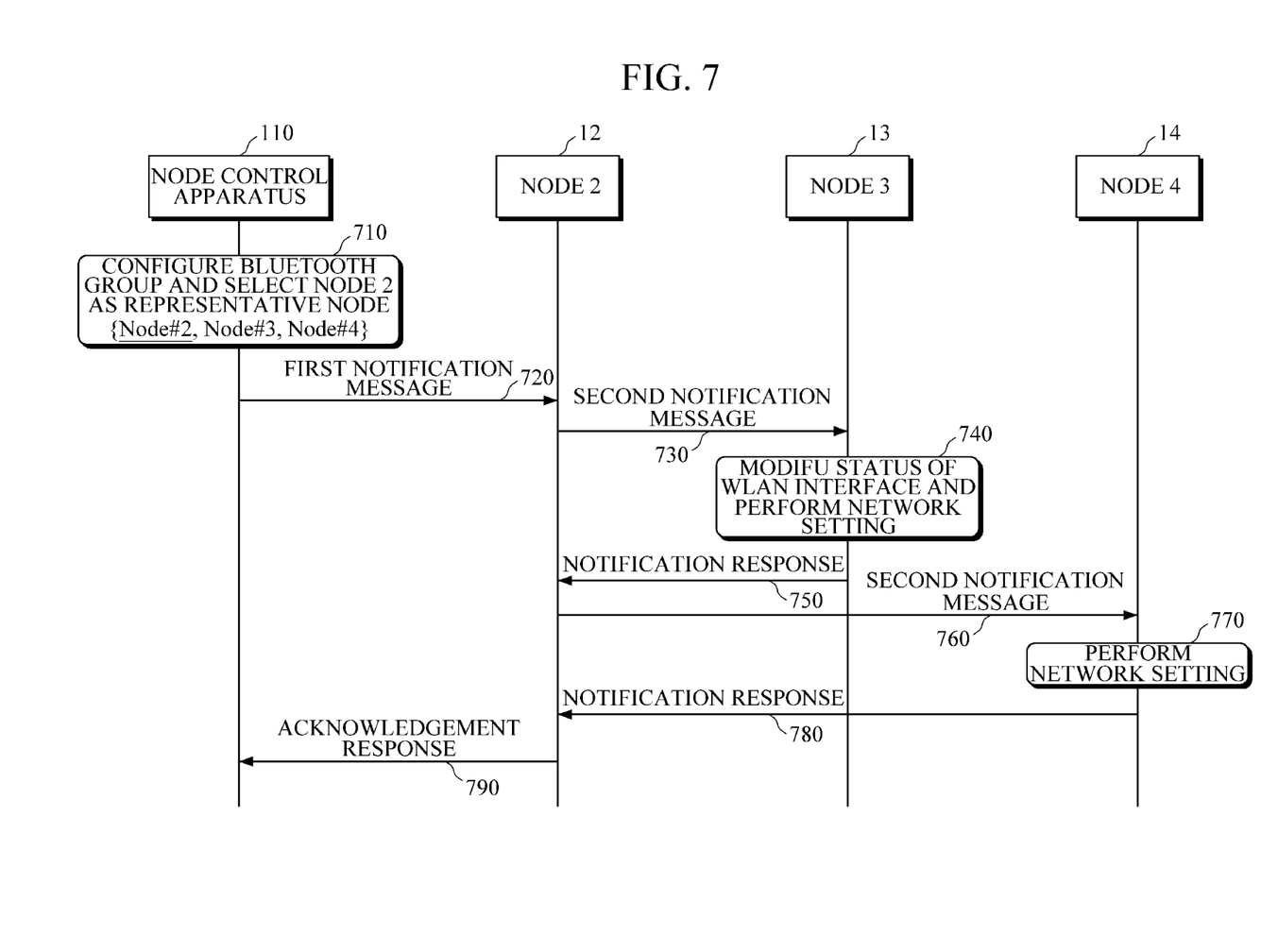
FIG. 7 is a diagram illustrating an example of a notification process that may follow the group configuration and representative node selection processes, according to an exemplary embodiment.

FIG. 7 illustrates an example of a notification process that may follow group configuration and representative node selection processes, according to an exemplary embodiment.

Referring to FIG. 7, in operation 710, the first node control apparatus 110 configures a Bluetooth group and selects the second node 12 as the representative node of the Bluetooth group, as illustrated in FIG. 6.

In operation 720, the first node control apparatus 110 transmits a first notification is message indicating that the second node 12 is the representative node of the Bluetooth group to the second node 12. The first notification message may include information relating to the representative node of the Bluetooth group and the IDs of the member nodes of the Bluetooth group, i.e., the L2 IDs of the third and fourth nodes 13 and 14.

In operations 730 and 760, the second node 12 transmits a second notification message indicating that the second node 12 is the representative node of the Bluetooth group to the third and fourth nodes 13 and 14. The second notification message may include information relating to the representative node of the Bluetooth group and information relating to a wireless interface via which to communicate in the Bluetooth group.

In response to receipt of the second notification message, the third node 13 uses the Bluetooth interface to communicate with the representative node of the Bluetooth group, i.e., second node 12. More specifically, in operation 740, the third node 13 may switch its WLAN interface to "sleep" or "off" mode and may complete network setting for the Bluetooth interface to communicate with the second node 12. In operation 750, the third node 13 may transmit a response message to the second node 12 as a response to the second notification message.

Similarly, in operation 770, the fourth node 14 may complete network setting for the Bluetooth interface to communicate with the second node 12. In operation 780, the fourth node 14 may transmit a response message to the second node 12 as a response to the second notification message.

In operation 790, in response to receipt of the response messages transmitted by the third and fourth nodes 13 and 14, the second node 12 transmits an acknowledgement (ACK) message indicating that the notification process is complete to the first node control apparatus 110.

The first notification message may include a node address allocated to the fourth node 14 by the first node control apparatus 110, as illustrated in FIG. 5. Referring to FIG. 5, the node address allocated to the fourth node 14 is an ID for use in L3 communication. The node address allocated to the fourth node 14 is not for use in communication via the Bluetooth interface. Instead, the node address allocated to the fourth node 14 may be used to connect to an external IP network via a representative node.

Figure 8:
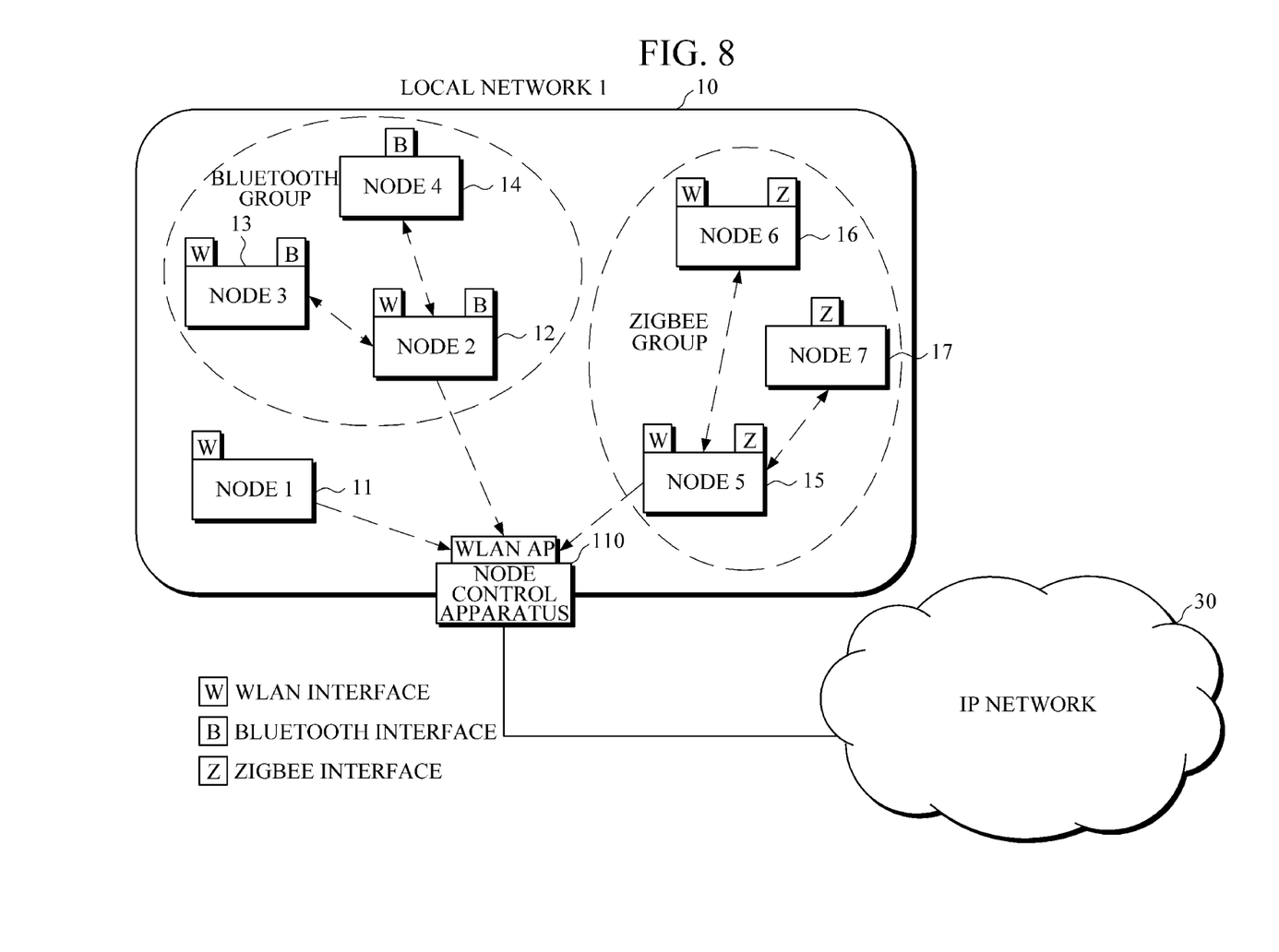
FIG. 8 is a diagram illustrating an example of a system in which nodes are grouped according to their wireless interface(s) and communicate with one another via their representative node, according to an exemplary embodiment.

FIG. 8 illustrates an example of a system in which nodes are grouped according to their wireless interface(s) and communicate with one another via their representative node, according to an exemplary embodiment.

Referring to FIG. 8, the third node 13 may maintain its connectivity to an external IP network 30 by L2-communicating with the representative node of the Bluetooth group, i.e., the second node 12. In this example, the third node 13 may reduce its power consumption by operating the Bluetooth interface only. The fourth node 14, like the third node 13, may be connected to the external IP network 30 via the second node 12 by using the Bluetooth interface.

The sixth and seventh nodes 16 and 17, which are included in the ZigBee group, may be connected to the external IP network 30 via the representative node of the ZigBee group, i.e., the fifth node 15. In this example, the sixth node 16 may reduce its power consumption by operating the ZigBee interface only.

A low power-based communication interface such as the Bluetooth interface is generally used for transmitting small amounts of data (such as audio data), and is thus equipped with a minimal application capability including a Transmission Control Protocol/Internet Protocol (TCP/IP) stack. For example, a Bluetooth headphone simply receives audio data from a mobile phone or another device and provides the received audio data to a user. However, according to the present inventive concept, the fourth node 14 having the Bluetooth interface only may be directly connected to the Internet and may thus provide various audio services. Since the is bandwidth that can be processed by low power-based interfaces is expected to expand, not only audio services but also various other services may be provided by nodes having the Bluetooth interface only.

Figure 9:
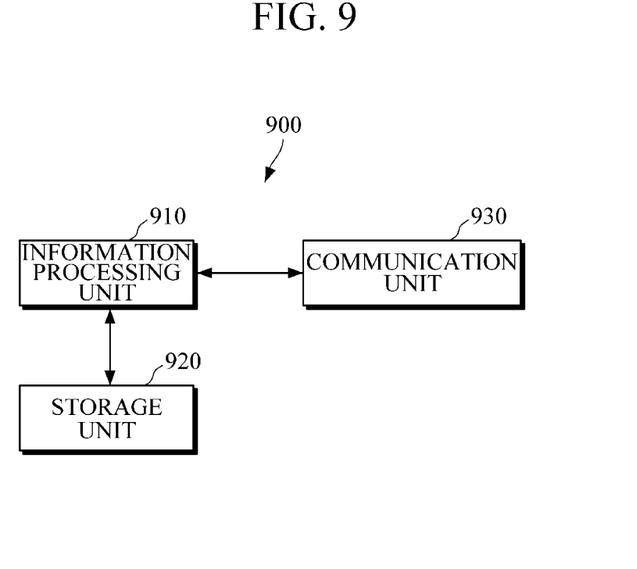
FIG. 9 is a block diagram illustrating an example of a node control apparatus according to an exemplary embodiment.

FIG. 9 illustrates a block diagram of an example of a node control apparatus according to an exemplary embodiment.

Referring to FIG. 9, a node control apparatus 900 includes an information processing unit 910, a storage unit 920, and a communication unit 930.

The information processing unit 910 manages information relating to a plurality of mobile nodes in a local network, each mobile node equipped with one or more wireless interfaces. The information processing unit 910 configures one or more groups in consideration of the type(s) of wireless interface(s) of each of the mobile nodes in the local network, and selects representative nodes for the groups. The representative nodes allow their respective member nodes to communicate with an external network therethrough.

The storage unit 920 stores a local network management table including information relating to the mobile nodes in the local network.

The communication unit 930 is connected to an external IP network and communicates with one or more mobile nodes with a broadband wireless interface, among other mobile nodes in the local network.

In response to receipt of a neighboring node information update request message, including neighboring node information, from each of the mobile nodes with the broadband wireless interface, the information processing unit 910 may create the local network management table based on the neighboring node information.

The information processing unit 910 may allocate a node address to each of the mobile nodes in the local network so that the corresponding mobile nodes can be identified by the node addresses allocated thereto. To configure one or more groups, the information processing unit 910 may identify the type(s) of wireless interface(s) of each of the mobile nodes in the local network, may group one or more mobile nodes with the broadband wireless interface only into a first group, and may group the rest of the mobile nodes in the local network into one or more second groups according to the type(s) of their non-broadband wireless interface(s).

The information processing unit 910 may calculate an importance score of each mobile node included in each group by using one or more factors that affect the performance of a wire interface, may select a node with a highest importance score from each group as a representative node, and may send a first notification message including group information to the representative node.

For example, the information processing unit 910 may calculate the importance score of each mobile node by applying a weight to each of the factors that affect the performance of a wire interface. The first notification message may include the L2 IDs (for example, Bluetooth IDs or ZigBee IDs) of member mobile nodes of the group where the representative node belongs.

Figure 10:
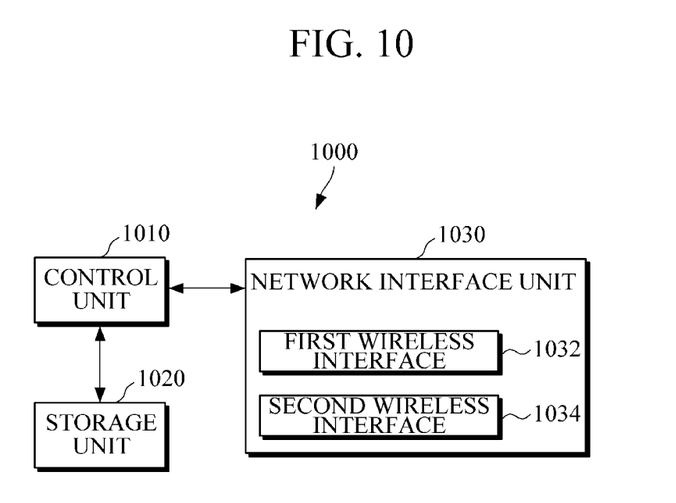
FIG. 10 is a block diagram illustrating an example of a node according to an exemplary embodiment.

FIG. 10 illustrates a block diagram of an example of a node according to an exemplary embodiment.

Referring to FIG. 10, a node 1000 includes a control unit 1010, a storage unit 1020, and a network interface unit 1030.

The node 1000 may be a representative node or simply a member node of a particular group obtained by classifying a plurality of nodes in a local network according to the type(s) of their wireless interface(s).

The control unit 1010 collects information relating to one or more neighboring nodes, transmits a neighboring node information update request message, including the neighboring node information, to a node control apparatus (not shown) via the network interface unit 1030 so that a local network management table including information relating to a plurality of nodes included in the local network of the node 1000 can be configured based on the neighboring node information. The local network management table may include wireless interface information, available bandwidth information, and power consumption information of each neighboring node of the node 1000.

In response to the node 1000 being a representative node of its group, the node 1000 may receive a first notification message, including information relating to the group of the node 1000, from the node control apparatus. In response to the receipt of the first notification message, the control unit 1010 may generate a second notification message indicating that the node 1000 is the representative node of its group, and may transmit the second notification message to each member node of the group of the node 1000 via the network interface unit 1030. The second notification message may include information indicating a wireless interface to be used and an L3 ID for use in L3 communication.

The network interface unit 1030 may include one or more wireless interfaces. The network interface unit 1030 may include, but is not limited to, a first wireless interface 1032 and a second wireless interface 1034. For example, the network interface unit 1030 may include the WLAN interface, which is a type of broadband wireless interface, and at least one of the Bluetooth interface and the ZigBee interface.

In response to the node 1000 being a member node of its group, the node 1000 may receive a second notification message from the representative node of its group. In response to the receipt of the second notification message, the control unit 1010 may control the network interface unit 1030 such that only a wireless interface indicated by wireless interface information included in the received second notification message can be activated so as to prevent other wireless interfaces from consuming power.

Exemplary embodiments have been described above, taking the WLAN interface, the Bluetooth interface, and the ZigBee interface as examples. However, the present inventive concept can also be applied to other various wireless interfaces.

The processes, functions, methods, and/or software described herein may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules that are recorded, stored, or fixed in one or more computer-readable storage media, in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An operating method of a node control apparatus connected to an external Internet Protocol (IP) network and a local network, the operating method comprising:
    managing information relating to a plurality of mobile nodes in the local network, each equipped with one or more wireless interfaces;
    configuring one or more groups by classifying the plurality of mobile nodes according to the type(s) of the wireless interface(s) of each of the plurality of mobile nodes;
    selecting a representative node for each of the groups by:
        calculating an importance score of each of the mobile nodes in each of the groups by using a summation of weighted factors that affect the performance of a wireless interface; and
        selecting and maintaining a node with a highest importance score from each of the groups as the representative node,
    allowing one or more member nodes of each of the groups to communicate with the external IP network via their representative node.

2. The operating method of claim 1, wherein the managing comprises:
    receiving a neighboring node information update request message, including neighboring node information, from one or more mobile nodes with a broadband wireless interface; and
    configuring a local network management table, including the information relating to the plurality of mobile nodes, based on the neighboring node information included in the neighboring node information update request message.

3. The operating method of claim 2, further comprising:
    allocating a node address to each of the nodes with the broadband wireless interface so that the corresponding nodes can be identified by the node addresses allocated thereto.

4. The operating method of claim 1, wherein the configuring comprises:
    identifying the type(s) of the wireless interface(s) of each of the plurality of mobile nodes;
    grouping one or more mobile nodes with the broadband wireless interface only into a first group; and
    grouping the rest of the plurality of mobile nodes into one or more second groups according to the type of their non broadband wireless interface.

5. A node control apparatus communicating an external Internet Protocol (IP) network and managing a plurality of mobile nodes included in a local network, the node control apparatus comprising:
    an information processing unit which manages information relating to the plurality of mobile nodes, each equipped with one or more wireless interfaces, configures one or more groups by classifying the plurality of mobile nodes according to the type(s) of the wireless interface(s) of each of the plurality of mobile nodes; and selects a representative node for each of the groups by:
        calculating an importance score of each of the mobile nodes in each of the groups by using a summation of weighted factors that affect the performance of a wireless interface; and
        selecting and maintaining a node with a highest importance score from each of the groups as the representative node,
    a communication unit which is connected to the external IP network and communicates with one or more mobile nodes with a broadband wireless interface, among the plurality of mobile nodes.

6. The node control apparatus of claim 5, wherein the information processing unit receives a neighboring node information update request message, including neighboring node information, from one or more mobile nodes with a broadband wireless interface and configures a local network management table, including the information relating to the plurality of mobile nodes, based on the neighboring node information included in the neighboring node information update request message.

7. The node control apparatus of claim 5, wherein the information processing unit allocates a node address to each of the nodes with the broadband wireless interface so that the corresponding nodes can be identified by the node addresses allocated thereto.

8. The node control apparatus of claim 5, wherein the information processing unit identifies the type(s) of the wireless interface(s) of each of the plurality of mobile nodes, groups one or more mobile nodes with the broadband wireless interface only into a first group, and groups the rest of the plurality of mobile nodes into one or more second groups according to the type of their non broadband wireless interface.

9. The node control apparatus of claim 5, wherein the information processing unit transmits a first notification message to the representative node via the communication unit.

10. The node control apparatus of claim 9, wherein the first notification message includes Layer 2 (L2) identifiers (ID) of member nodes of the group that the representative node belongs to.

11. A mobile node, comprising:
- a network interface unit which includes a broadband wireless interface; and
- a control unit which collects information relating to one or more neighboring nodes, transmits a neighboring node information update request message, including the collected information, to a node control apparatus via the network interface unit, and configures a neighboring node information management table based on the collected information,
- wherein the neighboring node information management table indicates when a neighboring node discovery request message is transmitted and when a neighboring node discovery response message is received,
- wherein the mobile node is determined to be a representative node of a particular group of mobile nodes by calculating an importance score of each of the mobile nodes by using a summation of weighted factors that affect the performance of a wireless interface, and
- wherein the mobile node is maintained as the representative node.

12. The mobile node of claim 11, wherein the neighboring node information management table shows wireless interface information of each of the neighboring nodes and available bandwidth information and power consumption information for each wireless interface of each of the neighboring nodes.

13. The mobile node of claim 11, wherein, in response to receipt of a first notification message indicating that the mobile node is a representative node of a particular group and including group configuration information relating to the particular group, the control unit generates a second notification message indicating that the mobile node is the representative node of the particular group and transmits the second notification message to one or more mobile nodes, which are specified in the group configuration information as being member nodes of the particular group, via the network interface unit.

14. The mobile node of claim 13, wherein the second notification message includes wireless interface information indicating a wireless interface to be used and a Layer 3 (L3) identifier (ID) for use in L3 communication.

15. The mobile node of claim 11, wherein the network interface unit further includes a wireless interface, which is different from the broadband wireless network interface, and in response to receipt of a second notification message from another mobile node, the control unit controls the network interface unit to use only a wireless interface corresponding to wireless interface information included in the second notification message while preventing another wireless interface from consuming any power.

* * * * *